US008485894B2

(12) United States Patent
Parham

(10) Patent No.: US 8,485,894 B2
(45) Date of Patent: Jul. 16, 2013

(54) SECOND PLAYER BONUS GAME

(75) Inventor: Tyler T. Parham, Reno, NV (US)

(73) Assignee: Gaming Enhancements, Inc., Reno, NV (US)

( * ) Notice: Subject to any disclaimer, the term of this patent is extended or adjusted under 35 U.S.C. 154(b) by 0 days.

(21) Appl. No.: 12/877,770

(22) Filed: Sep. 8, 2010

(65) Prior Publication Data

US 2011/0065493 A1 Mar. 17, 2011

Related U.S. Application Data

(60) Provisional application No. 61/242,318, filed on Sep. 14, 2009.

(51) Int. Cl.
*A63F 13/00* (2006.01)

(52) U.S. Cl.
USPC .................................. 463/26; 463/20; 463/25

(58) Field of Classification Search
USPC ................ 463/16, 20, 21, 22, 25, 29, 31, 26, 463/27
See application file for complete search history.

(56) References Cited

U.S. PATENT DOCUMENTS

| | | | | |
|---|---|---|---|---|
| 2006/0166741 | A1* | 7/2006 | Boyd et al. | 463/42 |
| 2007/0015571 | A1* | 1/2007 | Walker et al. | 463/25 |
| 2007/0167238 | A1* | 7/2007 | Gatto et al. | 463/42 |
| 2009/0042644 | A1* | 2/2009 | Zielinski | 463/27 |
| 2009/0239657 | A1* | 9/2009 | Ryan et al. | 463/25 |
| 2010/0197385 | A1* | 8/2010 | Aoki et al. | 463/27 |
| 2011/0105218 | A1* | 5/2011 | Anderson et al. | 463/20 |

* cited by examiner

*Primary Examiner* — James S McClellan
(74) *Attorney, Agent, or Firm* — Brian N. Young; Fountainhead Law Group P.C.

(57) ABSTRACT

In one embodiment, a method includes determining an event at a gaming device during game play for a first player. One or more bonus event symbols are determined in response to the event. The method sends the one or more bonus event symbols for a bonus game to a second player. When one or more of the bonus event symbols match a predetermined outcome, the second player is awarded a bonus award. In one embodiment, a method includes receiving a bonus event symbol from a second gaming device during game play on a first gaming device for a first player. It is determined if the bonus event symbol provides a match to a predetermined outcome. The second player is awarded a bonus award if the match is determined.

25 Claims, 9 Drawing Sheets

SECOND PLAYER BONUS GAME

CROSS REFERENCE TO RELATED APPLICATIONS

The present application claims priority to U.S. Provisional App. No. 61/242,318 for "Second Player Bonus Game" filed Sep. 14, 2009, the contents of which is incorporated herein by reference in their entirety.

BACKGROUND

Particular embodiments generally relate to gaming and, more particularly, game functionality for providing gaming machines with gaming device bonus games.

Gaming establishments, such as casinos, are always attempting to attract more players to their establishments. For example, gaming establishments mail promotions to players with offers that are designed to get the player to come to the casino and require that the player travel to the gaming establishment to receive the offer.

Gaming promotional offers and bonuses are sent from a system external from the game, such as the hotel management system or from the player tracking bonus system, and may cover a wide range of promotions and bonus games, such as free play on any gaming machine to a free night stay at the gaming establishment's venue. The promotional offers are also established ahead of time to lure high quality players to play at a particular venue during a specific time interval or event.

Bonus games may be predefined bonus games that are associated with the game results of a base game on the same gaming device. System bonuses exist that communicate bonus information and results from a central system based on a predefined set of criteria. Further, existing bonus systems may require players to be eligible to win bonus awards.

In each of these cases, bonus games are either dependent on the result of game play on the gaming device being played or the bonus game results from an event on a central system or bonus controller external from the gaming device and players must meet some form of eligibility requirement to qualify to win a bonus award.

SUMMARY

In one embodiment, a method includes determining an event at a gaming device during game play for a first player. One or more bonus event symbols are determined in response to the event. The method sends the one or more bonus event symbols for a bonus game to a second player. When one or more of the bonus event symbols match a predetermined outcome, the second player is awarded a bonus award.

In one embodiment, a method includes: during game play on a first gaming device for a first player, receiving a bonus event symbol from a second gaming device; determining if the bonus event symbol provides a match to a predetermined outcome; and awarding the second player a bonus award if the match is determined.

In one embodiment, a system includes: a first gaming device configured to: determine an event at a gaming device; determine a bonus event symbol in response to the event; and send the bonus event symbol for a bonus game associated with a second player. A second gaming device is configured to: receive the bonus event symbol from the first gaming device during game play on a second gaming device for a second player; determine if the bonus event symbol provides a match to a predetermined outcome; and award the second player a bonus award if the match is determined.

In one embodiment, a method includes: determining an event at an idle gaming device not being played; determining one or more bonus event symbols in response to the event; and sending the one or more bonus event symbols for a bonus game to a player, wherein when one or more of the bonus event symbols match a predetermined outcome, the player is awarded a bonus award.

In one embodiment, a method includes: during game play on a first gaming device for a first player, receiving a bonus event indication from a second gaming device based on a first event occurring on the second device; determining if the bonus event indication causes a second event at the first gaming device to occur; determining an award for the second event; and awarding the first player the award.

The following detailed description and accompanying drawings provide a better understanding of the nature and advantages of the present invention.

DETAILED DESCRIPTION

Figure 1:
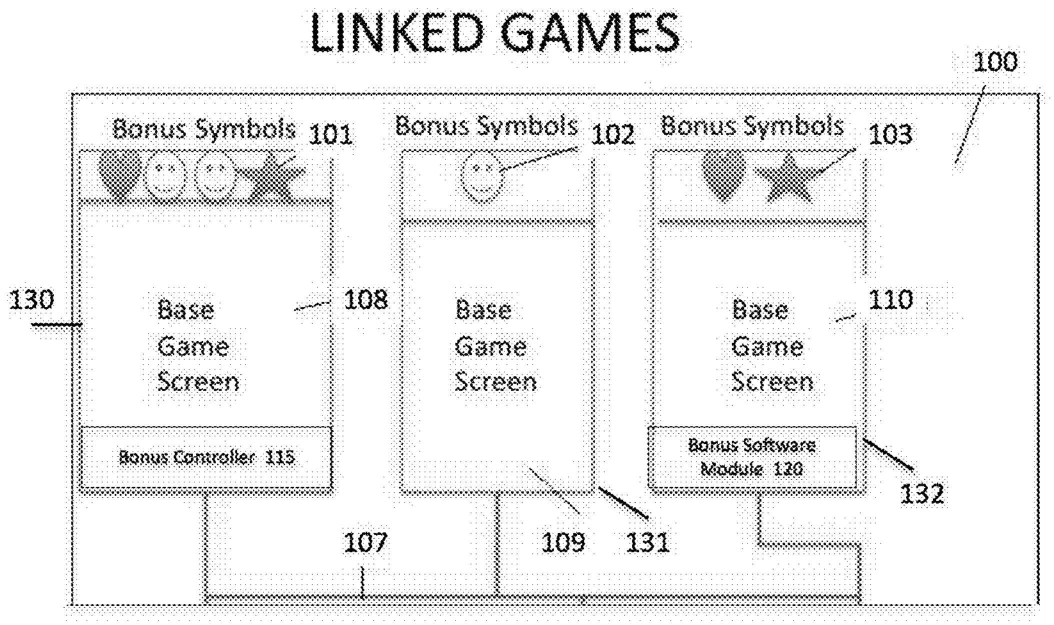
FIG. 1 shows a block diagram of a system configuration connecting a plurality of games together for purposes of participating in the second player bonus game system according to one embodiment.

Described herein are techniques for a secondary bonus on a second gaming machine resulting from bonus symbols delivered to second gaming machine from first gaming machines. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Particular embodiments provide the opportunity for player(s) (second player/gaming device) playing a gaming device to win one or more award(s) based on the outcome of one or more random and/or predetermined (events) that occur during the play of one or more different player's gaming devices (first player(s)).

In an embodiment, the second player bonus system is connected to at least two gaming devices. Each gaming device connected to the system has a controller that is programmed to generate predetermined and/or random bonus (symbols)/indicia based on at least one event occurring during the play of games on one or more first player's gaming devices. At least one or more of these bonus symbols/indicia generated from one or more first player's gaming devices and/or the combination of one or more first player's gaming devices are used to create random and/or predetermined outcomes/scenarios that are in turn used to create awards for second players playing different gaming device(s) participating in the second player bonus game.

The controller within the second player's gaming device(s) is additionally programmed to receive the bonus symbols transmitted from the first player's gaming device(s) that in turn are used to create outcomes/scenarios in order for the second player(s) to win awards.

Although first and second gaming players/devices are described, it will be understood that a same gaming device or player may act as both the first and second player during the course of the second player bonus game. For discussion purposes, a first and second player/device description will be used to describe the actions of the different players needed to implement and play the secondary bonus game.

In an embodiment, the first player(s) plays a base game such as poker, spinning reel or other game that results in a random game outcome. The base game is played by the first player(s) based on the rules of one of a plurality of traditional casino games such as poker, spinning reels and the like.

During the course of game play by the first player(s), at least one event occurs on the first player's gaming device independent from the game play of the base game and does not affect the payout of the first player's base game.

The at least one event occurring before, during or after the game play on first player's gaming device results in at least one unique bonus symbol being generated and displayed on the first player's and/or the second players gaming device. Based on the random or predetermined outcome of the bonus symbols, one or more second players playing one of a plurality of gaming devices have the opportunity to win an award that is generated from one or more first players gaming devices. In one example, a second player may receive different bonus symbols from different first players. For example, a "heart" symbol may be received from one player, and a "star" symbol is received from another player. The different symbols are received and if a pre-determined combination of symbols is received, the second player wins the second player bonus.

The bonus symbols may be displayed on the first and/or second player's gaming device main display, secondary display, ancillary display, or top box display. The symbols may be one of a plurality of symbols but are uniquely identified as being associated with at least one or more of the second player's gaming device.

Once a second player has collected a random or predetermined number of (symbols)/indicia, a specific predetermined sequence of symbols, a special symbol type, a special symbol number, or a combination of symbols, the second player is awarded the second player bonus independently from the base game play on the second player's gaming device.

In an embodiment, the winning bonus symbols generated from one or more first players gaming devices are not displayed on the second player(s) gaming device during the course of the second player bonus game.

In an embodiment, the second player awarding system controller may be programmed to notify the second player(s) of the first player's gaming device(s) identity in which a second player bonus outcome was received in order for the second player to know which first player's gaming device(s) was responsible for the win.

In one embodiment, two or more players play in the second player bonus game, but if only one player is playing a gaming device; the system may be designed to randomly generate any number of symbols from the gaming devices not being played in order for a player to participate in the second player bonus game. In this embodiment, the player playing the active gaming device may receive random bonus symbols/indicia associated with the second player bonus game from a plurality of gaming devices not being played.

Particular embodiments stimulate player interest, increase game play to lessen fall-off when the casino has a small number of players and stimulates groups of players to interact and create excitement as symbols are transmitted from one player to another.

Particular embodiments provide the opportunity for player(s) (i.e., a second player/gaming device) playing a gaming device to win one or more award(s) based on the occurrence of one or more random and/or predetermined (events) occurring on one or more different player's gaming devices (i.e., first player(s)). Events may be generated during game play on first player gaming machine or may be generated when a first player gaming machine is idle. Events may result in the transmission of a bonus symbol and/or bonus symbol message from a first player gaming machine to one or more second player gaming machine(s).

FIG. 1 shows a block diagram of a system configuration connecting a plurality of gaming devices 130, 131 and 132 together for purposes of participating in the second player bonus game system according to one embodiment. Second player bonus system 100 requires the connection of at least two gaming devices. Each gaming device 130, 131 and 132 are connected to a network 107. Each gaming device may have a dedicated secondary bonus controller, secondary bonus control software module or a combination of both. Gaming device 130 has a dedicated secondary bonus controller 115 and gaming device 132 has a secondary bonus software module 120 on the main game controller. Secondary bonus controller 115, secondary bonus software module 120, and gaming device 131 are programmed to generate predetermined and/or random bonus (symbols/indicia) 101, 102, 103 based on at least one event occurring during the play of games on one or more first player's gaming devices or when a particular game is idle. At least one or more of these bonus symbols/indicia generated from one or more first player's gaming devices and/or the combination of one or more first player's gaming devices are used to create random and/or predetermined outcomes/scenarios that are in turn used to create awards for second players playing different gaming device(s) participating in the second player bonus game.

In one embodiment, secondary bonus controller 115 in the second player's gaming device(s) 130 is also programmed to receive the bonus symbols transmitted from the first player's gaming device(s) 131 or 132 that in turn are used to create outcomes/scenarios for the second player(s) to win awards.

Although first and second gaming players/devices are described, it will be understood that a same gaming device or player may act as both the first and second player during the course of the second player bonus game. For discussion purposes, a first and second player/device description will be used to describe the actions of the different players needed to implement and play particular embodiments.

In an embodiment, the first player(s) plays a base game such as poker, spinning reel or other game that results in a random game outcome. The base game is played by the first player(s) based on the rules of one of a plurality of traditional casino games such as poker, spinning reels and the like.

During the course of game play by the first player(s), at least one event occurs on the first player's gaming device independent from the game play of the base game and does not affect the payout of the first player's base game.

Figure 2:
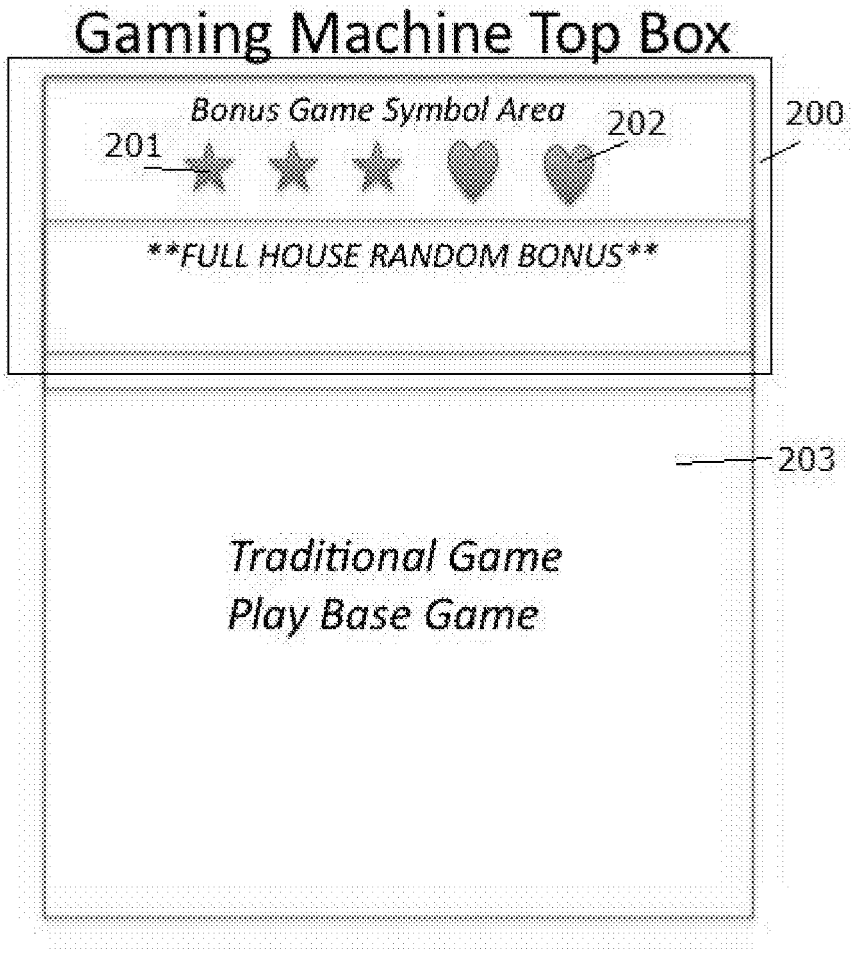
FIG. 2 depicts a gaming device top box with an area defined to display bonus symbols in the top box of a gaming device that are displayed during game play according to one embodiment.

The at least one event occurring before, during or after the game play on first player's gaming device results in at least one unique bonus symbol being generated and displayed on the first player's and/or the second players gaming device. For example, FIG. 2 depicts a gaming device top box with an area defined to display bonus symbols in the top box of a gaming device that are displayed during game play according to one embodiment. A specific symbol 201 may be randomly generated by a first player's gaming device as the result of a wager event made by the first player on a spinning reel game being played by the first player. Based on the random or predetermined outcome of the bonus symbols, one or more second players playing one of a plurality of gaming devices have the opportunity to win an award that is generated from one or more first player's gaming devices. Also, based on the random or predetermined combination of said bonus symbols 200, one or more second players playing one of a plurality of gaming devices have the opportunity to win a award independent from the player's game play. In one example, a second player may receive different bonus symbols from different first players. For example, a "heart" symbol 202 may be received from one player, and a "star" symbol 201 is received from another player. The different symbols are received and if a pre-determined combination of symbols is received, the second player wins the second player bonus.

Figure 2A:
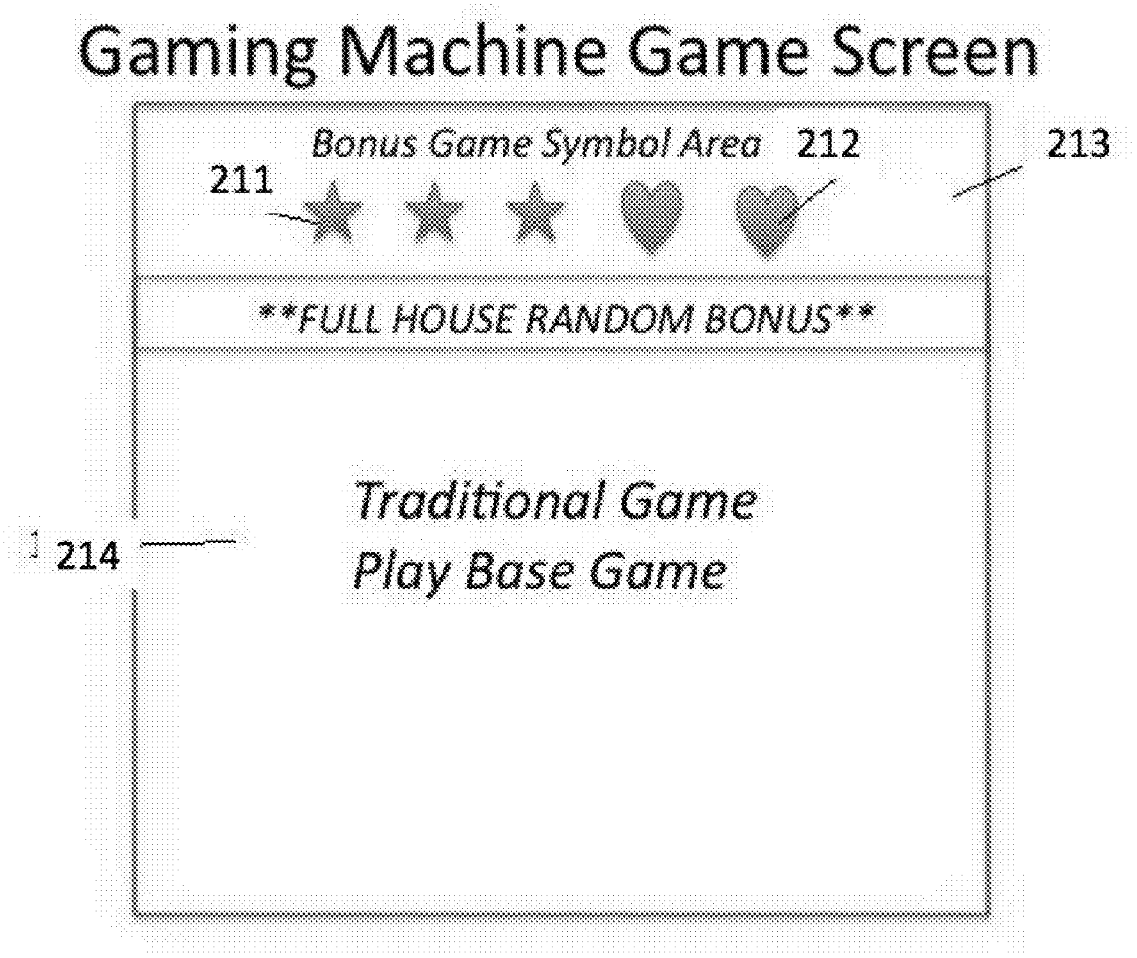
FIG. 2A depicts a gaming device game screen with an area defined to display bonus symbols displayed during game play according to one embodiment.

The bonus symbols may be displayed on the first and/or second player's gaming device main display, secondary display, ancillary display, or top box display. The symbols may be one of a plurality of symbols but are uniquely identified as being associated with at least one or more of the second player's gaming device. For example, FIG. 2A depicts a gaming device game screen 214 with an area 213 defined to display bonus symbols 211, 212 displayed during game play according to one embodiment.

Figure 4:
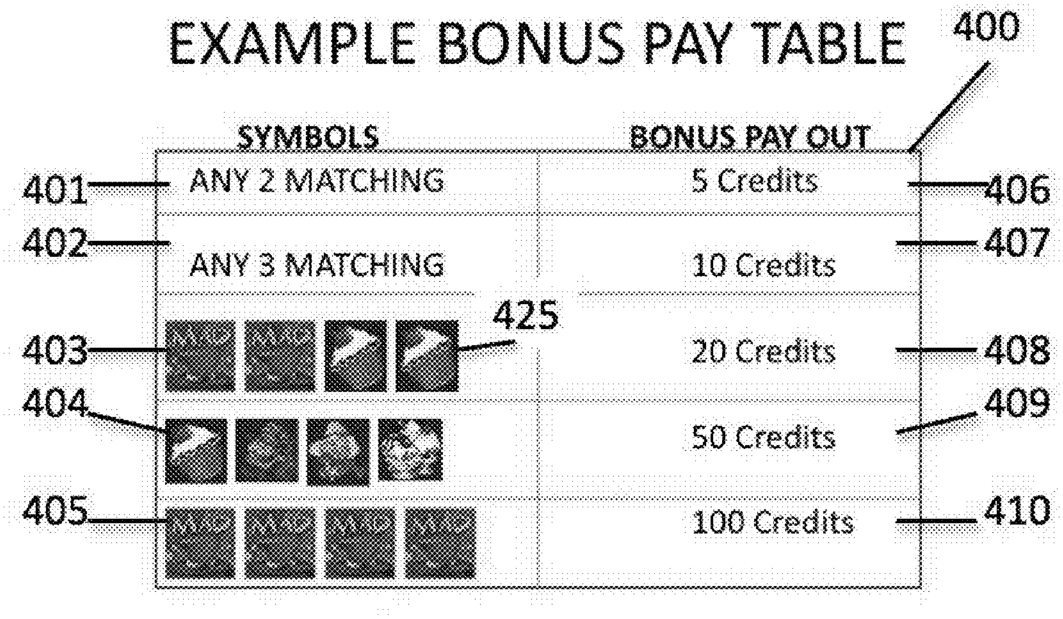
FIG. 4 is one example of a second player bonus paytable that is used by one embodiment to award second players upon collection of a plurality of symbols.

FIG. 4 is one example of a second player bonus paytable 400 that is used by one embodiment to award second players upon collection of a plurality of symbols. For example, a second player has collected a random or predetermined number of symbols/indicia, a specific predetermined sequence of symbols, a special symbol type, a special symbol number, or a combination of symbols. The second player is awarded the second player bonus independently from the base game play on the second player's gaming device. For example in one embodiment bonus pay table 400 resides within secondary bonus controller 115 of gaming device 130. Various combinations of symbols 401, 402, 403, 404, or 405 may be matched to win specific bonus payouts 406, 407, 408, 409, 410 on gaming device 130. When the second player receives four symbols 420 on the second player's gaming device 130, the second player receives a bonus award 410 of 100 credits. In an embodiment, the winning bonus symbols generated from one or more first players gaming devices are not displayed on the second player(s) gaming device during the course of the second player bonus game.

In an embodiment, the second player bonus controller 115 may be programmed to notify the second player(s) gaming devices 131 or 132 of the first player's gaming device 130 identity in which a second player bonus outcome was generated by the first player's gaming device 130 and received by a second player's gaming device 131 or 132 in order for the second player to be notified which first player's gaming device(s) was responsible for the second player's win.

In one embodiment, two or more players play in the second player bonus game, but if only one player is playing a gaming device; the system may be designed to randomly generate any number of symbols from the idle gaming devices not being played in order for a player to participate in the second player bonus game. In this embodiment, the player playing the active gaming device may receive random bonus symbols/indicia associated with the second player bonus game from a plurality of gaming devices not being played by a player. Particular embodiments stimulate player interest, increase game play to lessen fall-off when the casino has a small number of players and stimulates groups of players to interact and create excitement as symbols are transmitted from one player's gaming device to another.

Gaming devices 130, 131 and 132 may act as both the first and second players during the course of the second player bonus game. For example, a first player is playing gaming device 130 with a second player playing gaming device 132 and both players are playing in the second player bonus game. The first player is able to provide bonus symbol 103 for the second player and also receive bonus symbol 101 from the second player. The second player is able to receive a bonus symbol from the first player but also is able to provide bonus symbols to the first player. Whereupon a second player is able to receive an award based on the combination of symbols received from the first player, the first player may never receive a second player bonus award based upon events occurring upon the same first player's gaming device that provided the second player the opportunity to win.

In one embodiment, players may designate other players to receive bonus symbols. For example, a husband and wife may designate each other to receive each other's bonus symbols. In this way, dual play and multiple player play is encouraged. Also, the symbols may be provided to a second player that is randomly selected or has met a certain criteria, such as but not limited to, for example achieving a win above a certain threshold, wagering a certain amount within a predetermined time interval, and/or playing for a predetermined time interval.

The bonus symbols may be displayed on the first or second player's gaming device's main display, secondary display, ancillary display, or top box display as illustrated in FIG. 1 and FIG. 2. The symbols 211 and 212 may be displayed anywhere viewable by the player, such as on the top 213, bottom, left, right of the game display 214 or may be displayed entirely within the base game display 214.

In particular embodiments the bonus symbols may be displayed anywhere on any game display where a region is established on the display such as the top box, belly glass area or anywhere where the player may visually see the bonus symbols. For example, FIG. 2 depicts a gaming device top box 200 with an area defined to display bonus symbols 201, 202 in the top box 200 of a gaming device 203 that are displayed during game play according to one embodiment.

The bonus symbols displayed on a second player's gaming device can be one of a plurality of symbols and are uniquely identified as being associated with at least one first player's gaming device.

Upon the outcome of a specific number or group of bonus symbols from one or more first players to a second player, a second player is automatically awarded a bonus award. For example, in one embodiment the second player bonus may use a pay table 400 to define the award 406, 407, 408, 409 or 410 for receiving a specific sequence of symbols 401, 402, 403, 404, or 405 such as illustrated in FIG. 4.

In one or more embodiments, the second player may also be notified of the first player's gaming device's identity in which a second player bonus outcome was received, in order for the second player to win the second player bonus. Sounds may also occur on the first or second player's gaming device when the player generates and/or receives a new bonus symbol to prompt the player to look at the bonus symbols.

Figure 5:
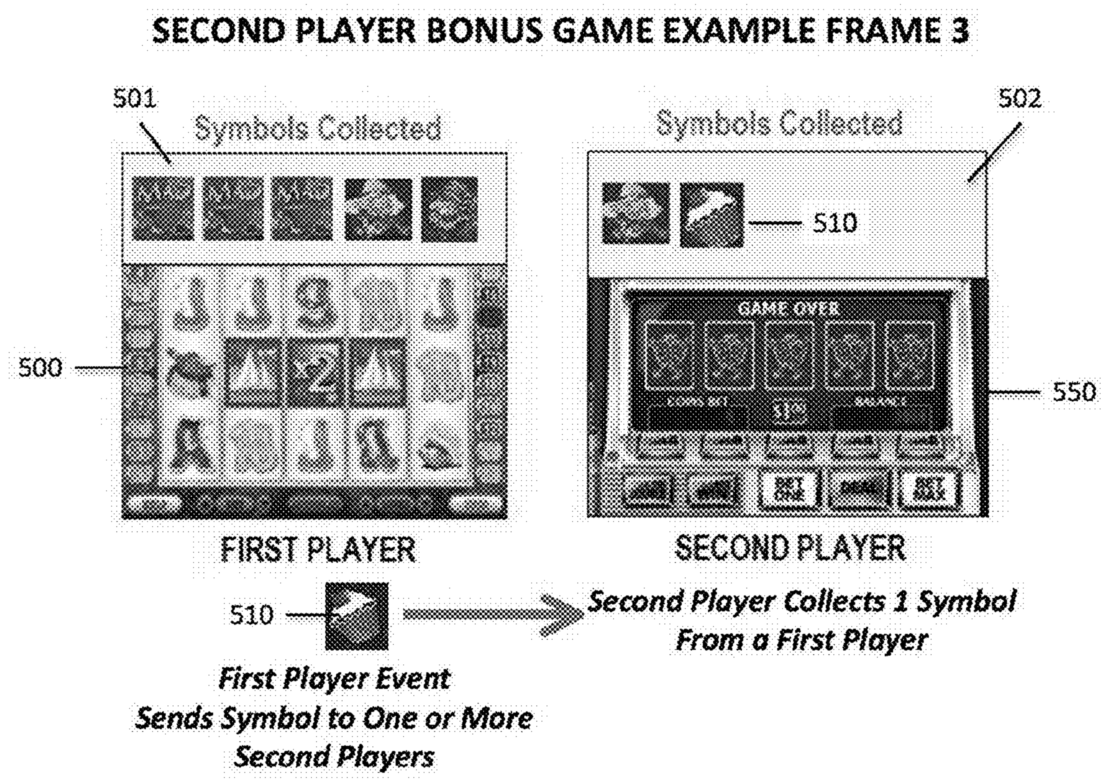
FIG. 5 is one example of a symbol being transmitted from a first player to a second player wherein the second player collects the symbols received.

In one embodiment, upon the outcome of a specific number of bonus symbols from a first player such as illustrated in FIG. 4, at least one second player is automatically awarded an award based on the game criteria of the second player bonus game available to the second player. For example, as illustrated in FIG. 1 a plurality of first players 108, 109 may be playing the base games on their gaming device and a second player may be playing gaming device 110. During the course of game play, a first player's game as illustrated in FIG. 5 may randomly generate one or more unique bonus symbols 510 on the first player's gaming device 500, which are then randomly transmitted to one or more second player's gaming device 550 over a network 107 where the bonus symbol 510 is displayed with other bonus symbols 502 that have been collected on gaming device 550.

Figure 6:
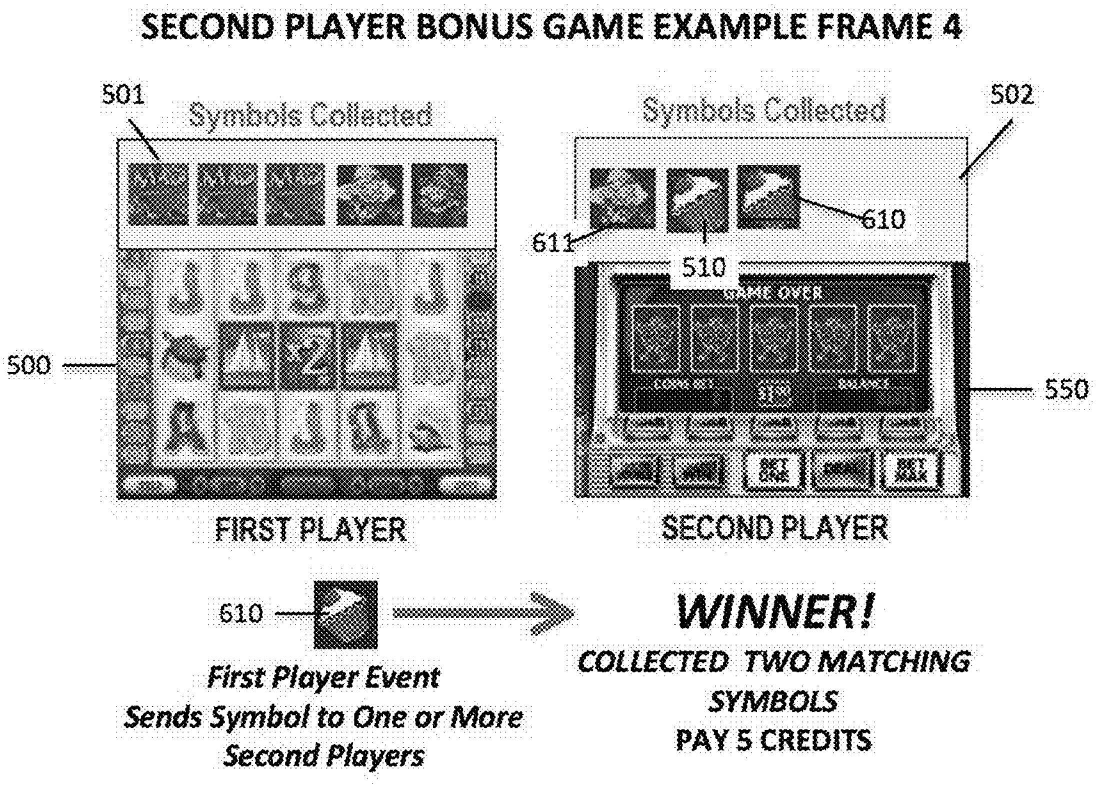
FIG. 6 is an example of a symbol being transmitted from a first player to a second player wherein the second player collects the symbols received and wins a second player bonus award based upon the collection of a specific sequence of symbols.

FIG. 6 is an example of a symbol 610 being transmitted from a first player's gaming device 500 to a second player's gaming device 550 wherein the second player's gaming device 550 collects the symbols received 611, 510, 610 and wins a second player bonus award based upon the collection of a specific sequence of symbols collected 502. The second player collects the bonus symbols 510, 610 and 611 displayed on the symbols collected display 502 on gaming machine 550 from first player's gaming device 500. Once a specific sequence of bonus symbols have been collected 510, 610 and 611, the second player wins the second player bonus award as illustrated in FIG. 6.

In one embodiment, bonus symbols on a second player's gaming device that have been received from a plurality of first players may include stars from one first player, clubs from another first player, diamonds from yet another first player, and so on. As other second players receive bonus symbols from first players, the bonus symbols are displayed on each of the respective second player's gaming devices.

Once a second player has collected a random or predetermined number of symbols/indicia, a specific predetermined sequence of symbols, a special symbol type, a special symbol number, or a combination of symbols from one or more first players, the second player is awarded the second player bonus independently from the base game play on the second player's gaming device by the gaming device's second player bonus controller and independently from any external bonus systems outside of the gaming device. For example, a second player may receive three stars and two diamonds and thus receive a second player bonus award based on a second player bonus pay table emulating a traditional poker game's paytable such that the combination of two diamonds and three stars equate to a full house bonus award which is automatically awarded to the second player. The bonus award then causes the second player's credit meter to increase appropriately.

In another embodiment, a bank of gaming devices, such as 5 gaming devices, are designed to include the second player bonus. Each gaming device is associated with unique bonus symbols (e.g., Stars for device.1, Moons for device.2, Planets for device.3, Spaceships for device.4 and Meteors for device.5. When more than one first player(s) play one of the gaming devices it enters its symbols into the second player bonus. Next, when the first player plays one of the gaming devices, it generates symbols only associated from one or more of the other gaming devices being played. The generated symbols associated with the other gaming devices being played are display on the first players gaming device. When a random or predetermined number of symbols are displayed, for example five Planets, on the first players gaming device, the associated gaming device, for example gaming device 3, wins a random bonus award, a progressive prize award or predetermined bonus award. Furthermore, as multiple gaming devices are being played, the second player's gaming device(s) may collect a random or predetermined number of symbols generated from the one or more first player's gaming device(s) wherein the symbols are needed to win the second player bonus.

In another embodiment, if only one device is being played; the system may be designed to randomly generate symbols from gaming devices not being played. In this embodiment, the player playing the gaming device may receive random bonus symbols associated with the second player bonus from the games not being played so they are able to participate in the second player bonus game independently and without other players playing gaming devices.

In another embodiment, if two or more devices are being played the second player bonus may prompt the players with an invitation to play against one another. In this embodiment the first player to receive any number of symbol sequences, such as, but not limited to, a random symbol, a predetermined number of symbols, unique symbol sequences, unique types of symbols, or a predetermined combination of symbols from the other gaming devices would win the second player bonus award.

In another embodiment, the gaming devices second player bonus game method is initiated on a second player's gaming device by events occurring on a first player's gaming device.

The first player plays a base game such as poker, spinning reel or other game that results in a random game outcome. The base game is played by the first player based on the rules of one of a plurality of traditional casino games such as poker, spinning reels and the like.

During the course of game play by a first player, random events occur on the first player's game that are unknown to the first player and do not affect the payout on the first player's base game. The random events result in unique bonus event symbols being transmitted randomly from a first player's gaming device to a second player's gaming device based on one or more bonus game criteria occurring on a first player's gaming device that may occur as a result of game play by a first player. The second player's gaming device accepts the bonus event symbol from the first player's gaming device and displays the unique symbol on the second player's gaming device anywhere on the gaming device visible to the player such as the main display, secondary display, ancillary display, or top box display as depicted in FIG. 1 and FIG. 2. The symbols may be displayed anywhere on the game screen such as the top, bottom, left, right, or within the base game display. In other embodiments the symbols may be displayed anywhere on any game display where a region is established on the display such as the top box, belly glass area or anywhere where the player will visually see the symbols.

The second player may be notified of the bonus win by sound and an additional graphical presentation and/or animations on the second player's gaming device as illustrated on FIG. 2.

Other unique sequences of symbols may result in an unlimited number of bonus pay table scenarios independent from the first player's base game and independent from the second player's base game and awarded to at least one second player collecting the unique sequences, type, number or combination of symbols.

If more than one second player simultaneously receives a sequence resulting in a bonus award, both players may receive the same award or the award may be split between all winning players. If more than one second player receives one of a plurality of possible bonus wins simultaneously, both players may receive the bonus award based on the pay table associated with the bonus.

Bonus awards may be incrementing cash amounts such as a progressive prize award being incremented by game play, time, or occurrence of a random event, such as receipt of a symbol. Any number of events may cause the bonus payout amount to increase for a period of time after which the bonus award cash amount returns to some lesser amount if a second player has not won the bonus award.

In other embodiments, game play events on a first player's gaming device may cause the generation of a symbol to occur and then be displayed and transmitted to a second player. An example of game play events may include but is not limited to base game symbols occurring during a reel spinning game, specific playing cards displayed during a poker game and/or specific numbers occurring during a video keno game.

The funding of second player bonus awards may come from a variety of sources. In one embodiment, the funding is provided directly from promotional dollars allocated by the casino to fund the second player bonuses and/or prizes. The promotional dollars may be from revenue other than coin-in, such as revenue from rooms, food, beverages, entertainment, etc. In another embodiment, bonus funding is provided by a second player buying into the second player bonus game through the payment of a secondary bet that qualifies the player to receive symbols and to win second player bonus awards based on those symbols. Secondary bets may be required each time the player plays the base game in order to qualify to receive symbols and play for the bonus prize. In other embodiments, a buy in payment made on the second player's gaming device may qualify the second player for the random bonus during the entirety of that specific second player's play session on a particular gaming device.

In one embodiment, the second player bonus game software code associated with the second player random second player bonus game may be independent from the base game of the first and second player's gaming device and located within the gaming device on a secondary bonus controller 115. In one embodiment, an additional module of secondary bonus software 120 to manage the random bonus functionality is co-located with the base game on each of the first player and second players gaming devices but operates independently from the first player and second player's base game.

Figure 3:
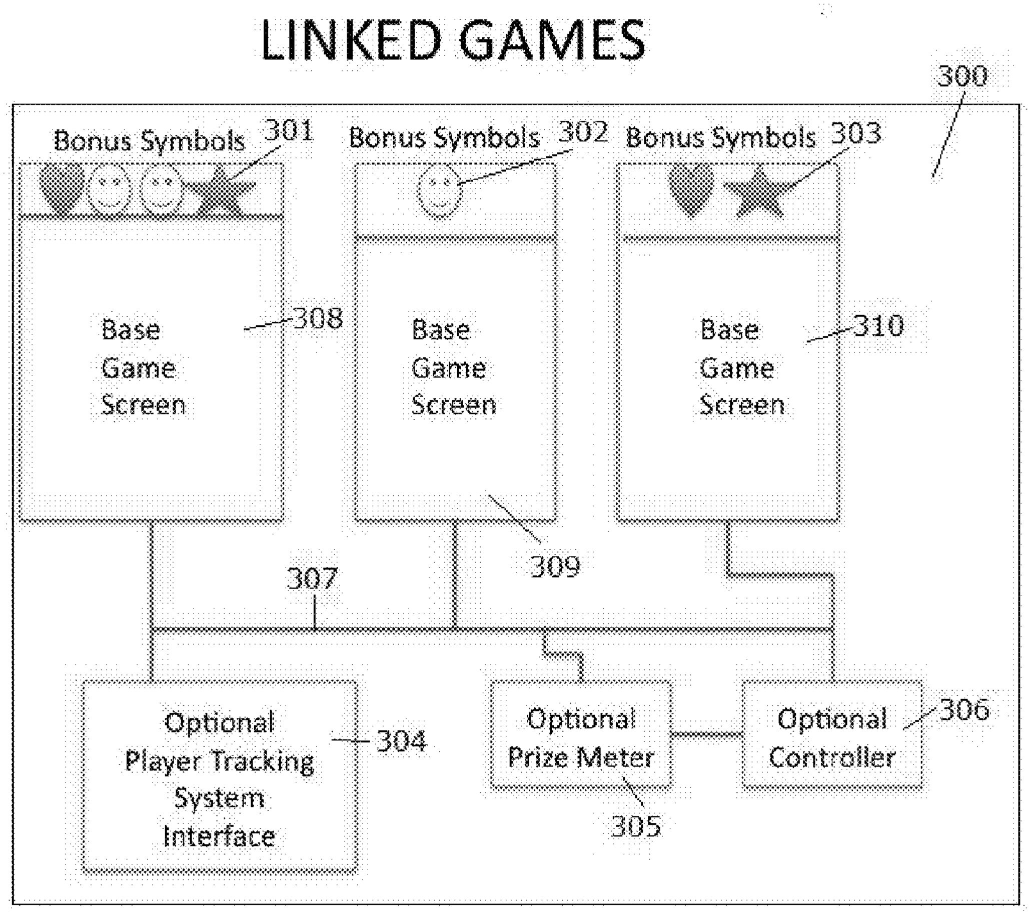
FIG. 3 shows a block diagram of a system configuration connecting a plurality of games together for purposes of participating in the second player bonus game system according to one embodiment.

In other embodiments, FIG. 3 shows a block diagram of a system configuration 300 including a network 307 connecting a plurality of gaming devices 30, 309, 310 together for purposes of participating in the second player bonus game system. An external controller device 306 (Optional Controller) may reside outside of the gaming device to collect, manage and/or distribute configuration information, bonus award information and prize information. A prize meter 305 may also be connected to network 307 to display specific secondary bonus prizes. The network 307 may further be connected to player tracking system 304 to collect and record player information specific to players playing gaming devices 308, 309 and 310.

In other embodiments, the second player game software code may be distributed across internal, external and system based controllers or any combination thereupon.

In one embodiment, the management of bonus prizes by controller 306 as shown in FIG. 3 and is associated with an incrementing bonus award amount that grows in value concurrent with game play either in specific predefined prize value increments or in random prize value increments and displayed on prize meter 305.

Second player bonus game symbols may be theme oriented and configured specifically for a casino or gaming venue or selected by the casino operator using controller 306 to introduce new second player bonus game themes such as casino specific promotions; for example, heart symbols for valentines day, shamrocks for St. Patrick's day, casino logo symbols, game bank symbols such as Monopoly symbols, Fort Knox symbols, Star Wars symbols, Star Trek symbols, other game theme oriented symbols, etc. In another embodiment, second player bonus game symbols may be player oriented by using a first player's name as the symbol that is communicated to a random second player's game from player tracking system interface 304 over network 307.

In another embodiment, the second player bonus system 300 communicates to the host player tracking system 304 to communicate player information to and from each of the first and second player gaming devices 308, 309 and 310.

Additionally, second player bonus game symbols may be persistent and continue where a second player left off during the second player's last game play session as a result of the second player using a player's player tracking card, player tracking RFID, entering player information and a password on the screen of the gaming device or other form of gaming device player recognition. For example, when the session begins, the second player bonus symbols previously collected during a prior game play session are transferred from the player tracking system to that specific second player and when the current game play session ends, the collected second player bonus symbols are then transferred from the second player's game back to the player tracking system.

Second player bonus game symbols may be session specific and only available to a second player for a bonus during a particular session of game play whose end is marked by the occurrence of an adjustable time interval of no game play on a particular gaming device thus establishing the presence of an active second player.

The second player bonus game facilitates the identification of first and second players by identifying the gaming device being played by a first or second player and all those gaming devices by which bonus symbols can be received which are participating in the second player bonus game. In order to identify a gaming device location that is meaningful to a first or second player in order for the particular player to know which gaming device just sent the gaming device with which they are playing a symbol, each gaming device associated with the second player bonus game may have one of many different forms of identification indicia placed on the participating gaming device. For example, a unique location identifier with location indicia may be placed on the gaming device in any location on the gaming device that is in the view of a player.

In one embodiment, such game location identifier may comprise a sticker that is secured to the gaming device. In other embodiments for those gaming devices moved often, a game location identifier may comprise a physical tag similar to a business office name-tag that can be placed on the gaming device in a temporary fashion using, for example, Velcro or other such easily removable materials. The identifier itself may include a pre-printed location identifier such as "ZONE 1, GAME 5" or may use an identifier with which the player can easily relate to such as "BY THE SPORTSBOOK, BANK 2, GAME 3". When the gaming device is moved, the identifier itself may be removed and placed on a different gaming device that takes the place of the gaming device being moved.

A plurality of pre-printed or manufactured identification tags are possible using many different styles of identification. For example, the identifiers may simply be game oriented such as "WHEEL OF FORTUNE, BY THE RESTROOM, GAME 2" or may be theme oriented such as "IN THE HIGH LIMIT AREA, BANK 2, GAME 1." Additionally, such identifiers may be casino oriented and defined by the casino with graphics and location identifier indicia information customized by the casino. In other embodiments, such identifiers may be pre-made and provided by a manufacturer separate from the casino.

Other identifiers are also possible such as, for example a physical ID comprised of a piece of plastic, wood or sheet metal that may be physically placed unsecured or easily secured, and easy to remove, on top of the gaming device with a location identifier sticker or other form of indicia identifier on the physical piece of plastic, wood or sheet metal. Using this form of physical identifier, the physical ID may be easily removed when a game is moved and easily placed on the gaming device taking its place.

Any number of communication methods for connecting the first player and second player gaming devices are possible as shown in FIG. 1. In one embodiment, a TCP/IP network 107 is used to provide connectivity to all participating and not participating gaming devices. In order for the first and second player gaming devices to communicate, specific messages containing content associated with the second player bonus are used for communicating second player bonus game messages. Second player bonus game messages may include: Graphics associated with the symbol to be displayed, predefined numbers associated with symbols preloaded to be displayed, bonus event winner, bonus event prize amount, and other related information associated with communicating details of the second player bonus award.

In another embodiment, a separate independent communication channel may exist to provide connectivity to only those games to be included in a second player bonus game. For example, within a gaming device bank of 8 gaming devices, each of the gaming devices may participate in the second player bonus game only if the gaming device has a specific communication link to connect to other gaming devices on the gaming device bank for communicating second player bonus information.

Figure 7:
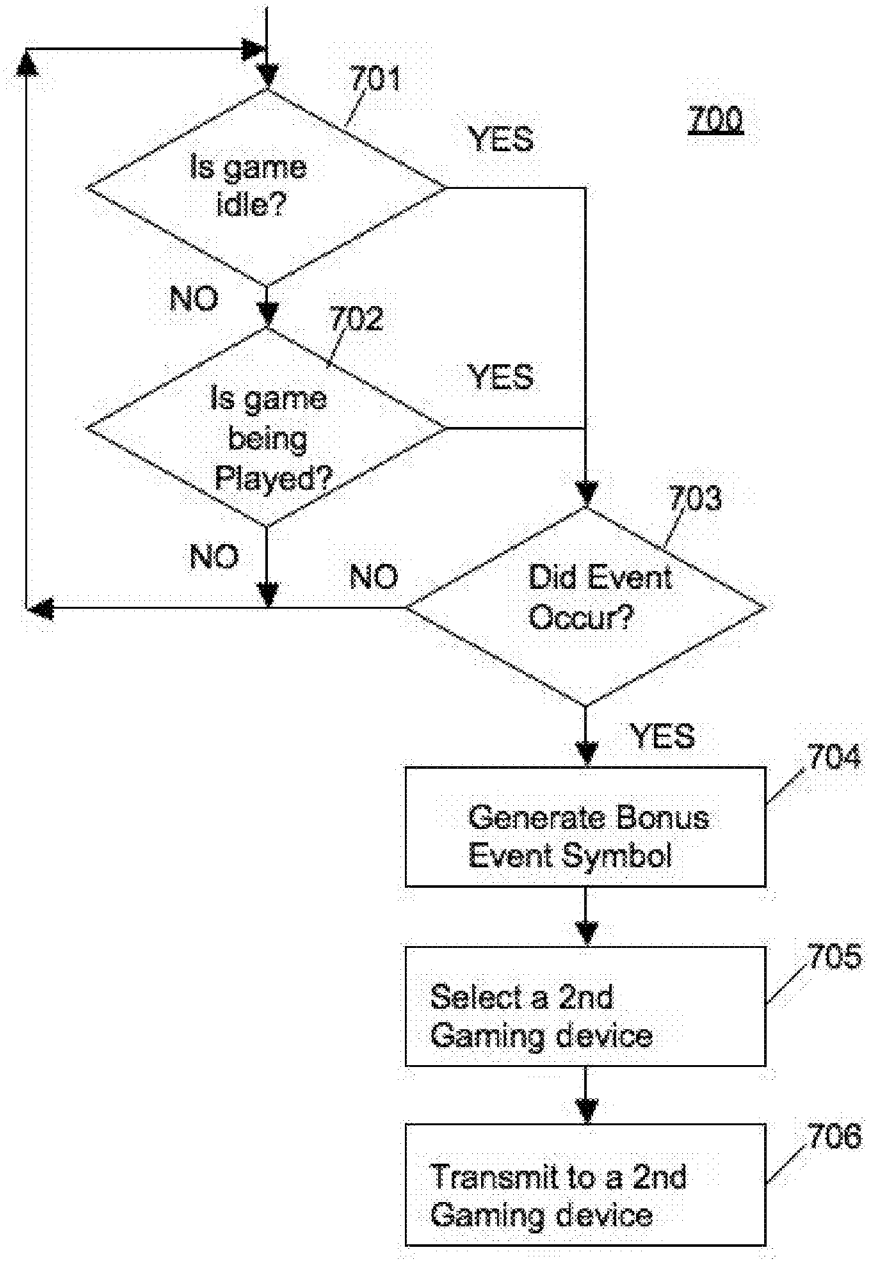
FIG. 7 depicts a simplified flowchart of a method for determining whether a bonus symbol is generated at a first player's gaming machine and transmitted to a second players gaming device according to one embodiment.

FIG. 7 depicts a simplified flowchart 700 of a method for determining whether a bonus symbol is generated at a first player's gaming machine and transmitted to a second players gaming device according to one embodiment. The method may be performed at gaming device 130, gaming device 131, gaming device 132, at another gaming device, or any combination thereof.

Step 701 determines if gaming device is idle. For example, if a gaming device is not being played by any players, the gaming device would be considered idle. For example, any games being offered by the gaming device are not being played. A threshold of a time limit in which a game has not been played on the gaming device may be used to determine the gaming device is idle.

Step 702 determines if gaming device is being played. For example, if a gaming device is being played by a player, the gaming device would be considered being played.

Step 703 determines if a second player bonus event occurred. For example, the bonus controller 115, bonus software module 120 or any combination thereof performs this step. If not, the process reiterates to step 701.

If a second player bonus event occurred, step 704 determines a method of generating a second player bonus event symbol. As discussed above, different methods of generating a second player bonus event symbol will be appreciated.

Step 705 selects a second gaming device. In one example, one gaming device from a set of gaming devices is selected.

Step 706 transmits the second player bonus event symbol to the selected gaming device in step 705. In one example, gaming device 130 transmits second player bonus event symbol to gaming device 131 over communication network 107.

Figure 8:
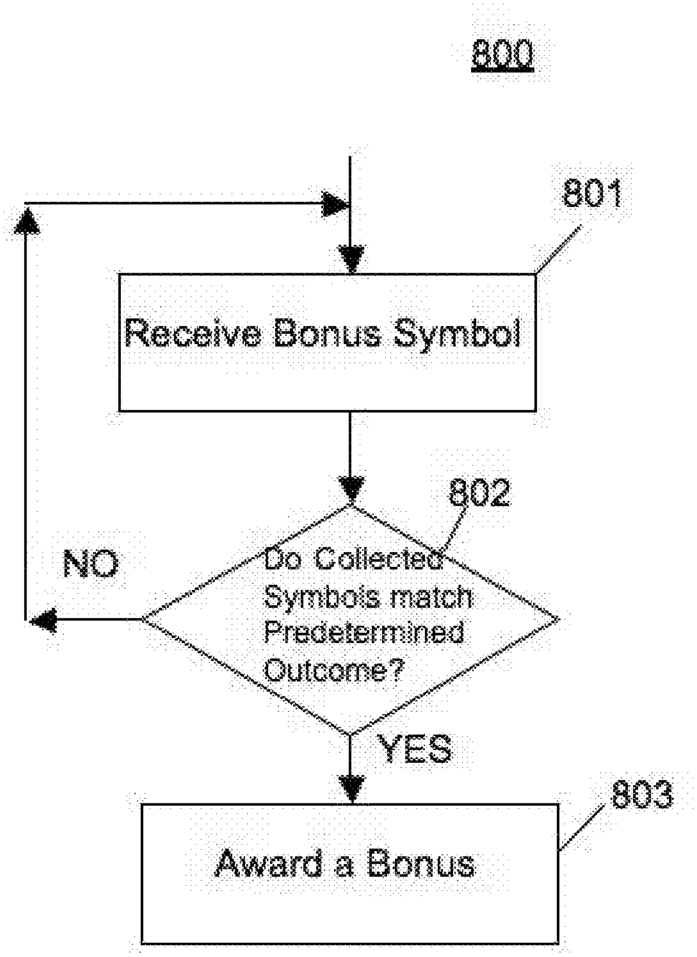
FIG. 8 depicts a simplified flowchart of a method for awarding a second player bonus award according to one embodiment.

FIG. 8 depicts a simplified flowchart 800 of a method for awarding a second player bonus award according to one embodiment. Step 801 receives a second player bonus symbol. For example, gaming device 130 transmits the second player bonus symbol to gaming device 131 whereupon gaming device 131 receives the second player bonus symbol.

Step 802 determines if the received second player bonus symbol along with previously collected second player bonus symbols match a predetermined outcome. If not, the process reiterates to step 801. For example, gaming device 550 in FIG. 6 receives second player bonus symbol 610. The second player bonus symbols collected 502 therein include second player bonus symbol 611, 610 and 510.

Step 803 awards a second player bonus award to a player on a second gaming device. For example, gaming device 550 in FIG. 6 receives second player bonus symbol 610. The second player bonus symbols collected 502 therein include second player bonus symbol 611, 610 and 510. This combination of symbols collected 502 results in a predetermined second player bonus award of 5 credits.

Particular embodiments may be implemented in a computer-readable storage medium for use by or in connection with the instruction execution system, apparatus, system, or machine. The computer-readable storage medium contains instructions for controlling a computer system to perform a method described by particular embodiments. The instructions, when executed by one or more processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:

during game play for a first player, determining an event at a gaming device;

determining one or more bonus event symbols in response to the event; and sending the one or more bonus event symbols for a bonus game to a second player, wherein:

when one or more of the bonus event symbols match a predetermined outcome, the second player is awarded a bonus award, the second player solely wins any bonus award based on the second player receiving the one or more bonus event symbols, and the first player is never eligible to win any of the bonus award awarded to the second player based on the sending of the one or more bonus event symbols for the bonus game to the second player.

2. The method of claim 1, wherein the event comprises a random event generated by the gaming device.

3. The method of claim 2, further comprising determining the one or more bonus event symbols based on the random event.

4. The method of claim 1, wherein the one or more bonus event symbols are determined based on the event.

5. The method of claim 4, wherein different events result in different bonus event symbols being determined.

6. The method of claim 4, wherein the gaming device is associated with a single bonus event symbol.

7. The method of claim 1, wherein sending comprises sending the one or more bonus event symbols from the first gaming device to a second gaming device being played by the second player.

8. The method of claim 1, further comprising sending the one or more bonus event symbols from the first gaming device to the second player when the gaming device is idle and not being played by the first player.

9. A method comprising:

during game play on a first gaming device for a first player, receiving a bonus event symbol from a second gaming device;

determining if the bonus event symbol provides a match to a predetermined outcome;

awarding the first player a bonus award if the match is determined, wherein:

the first player solely wins any bonus award based on the bonus event symbol matching the predetermined outcome, and the second gaming device is never eligible to win any of the bonus award awarded to the first player based on the receiving of the bonus event symbol from the second gaming device.

10. The method of claim 9, wherein the bonus award is awarded independently of the game play on the first gaming device.

11. The method of claim 9, wherein awarding comprises:

determining a sequence of bonus event symbols, the sequence including the received bonus event symbol;

comparing the sequence to a plurality of predetermined outcomes; and determining the bonus award based on the sequence matching one of the predetermined outcomes.

12. The method of claim 11, wherein the first gaming device and the second gaming device are competing against each other for the bonus award, wherein whichever gaming device receives the sequence matching one of the predetermined outcomes is awarded the bonus award.

13. The method of claim 9, wherein funding of a prize pool in which the bonus award is awarded is from promotional allowances not including coin-in to the first gaming device.

14. The method of claim 9, further comprising displaying identification information for the second gaming for the bonus event symbol received.

15. The method of claim 9, wherein the second gaming device is not being played by a second player when the bonus event symbol is sent from the second gaming device to the first gaming device.

16. The method of claim 9, wherein:

the bonus event symbol is received from the second gaming device that is being played by a second player, and the second player is never eligible to win any of the bonus award awarded to the first player based on the receiving of the bonus event symbol for the bonus game from the second player.

17. The method of claim 9, further comprising receiving a second bonus event symbol from an idle gaming device that is not being played.

18. A system, comprising:

a first gaming device configured to:

determine an event at the first gaming device;

determine a bonus event symbol in response to the event; and send the bonus event symbol for a bonus game associated with a first player;

a second gaming device configured to:

receive the bonus event symbol from the first gaming device during game play on the second gaming device for the first player;

determine if the bonus event symbol provides a match to a predetermined outcome; and award the first player a bonus award if the match is determined, wherein:

the first player solely wins any bonus award based on the first player receiving the bonus event symbol, and the first gaming device is never eligible to win any of the bonus award awarded to the first player based on the sending of the bonus event symbol for the bonus game to the second gaming device.

19. The system of claim 18, wherein:

the event is determined during game play of the first gaming device by a second player, and the second player is never eligible to win any of the bonus award awarded to the first player based on the sending of the bonus event symbol for the bonus game to the second gaming device.

20. The system of claim 18, wherein the bonus event symbol is determined randomly when the first gaming device is not being played.

21. The system of claim 18, wherein the bonus event symbol comprises a first bonus event symbol, the system further comprising:

a third gaming device, wherein the second gaming device is configured to:

receive a second bonus event symbol from the third gaming device; and determine if the first bonus event symbol and the second bonus event symbol provide the match to the predetermined outcome.

22. A method comprising:

determining an event at an idle gaming device not being played;

determining one or more bonus event symbols in response to the event; and sending the one or more bonus event symbols for a bonus game to a player, wherein when one or more of the bonus event symbols match a predetermined outcome, the player is awarded a bonus award, wherein:

the player solely wins any bonus award based on the player receiving the one or more bonus event symbols, and the idle gaming device is never eligible to win any of the bonus award awarded to the player based on the sending of the one or more bonus event symbols for the bonus game to the player.

23. The method of claim 22, wherein the event comprises a randomly generated event causing the idle gaming device to determine the one or more bonus event symbols.

24. The method of claim 22, wherein the event is determined after the player is playing a second gaming device, wherein the idle gaming device is initiated to generate one or more bonus event symbols.

25. A method comprising:

during game play on a first gaming device for a first player, receiving a bonus event indication from a second gaming device based on a first event occurring on the second device;

determining if the bonus event indication causes a second event at the first gaming device to occur;

determining an award for the second event; and awarding the first player the award, wherein:

the first player solely wins any award based on the first player receiving the bonus event indication, and the second gaming device is never eligible to win any of the bonus award awarded to the first player based on the receiving of the bonus event indication at the first gaming device.

* * * * *